N. THOMAS.
HAND PROPELLED WAGON.
APPLICATION FILED AUG. 22, 1906.

917,910.

Patented Apr. 13, 1909.
4 SHEETS—SHEET 2.

Witnesses:

Inventor:
Nicholas Thomas

N. THOMAS.
HAND PROPELLED WAGON.
APPLICATION FILED AUG. 22, 1906.

917,910.

Patented Apr. 13, 1909.
4 SHEETS—SHEET 3.

N. THOMAS.
HAND PROPELLED WAGON.
APPLICATION FILED AUG. 22, 1906.

917,910.

Patented Apr. 13, 1909.
4 SHEETS—SHEET 4.

Witnesses:
L. V. Domarus.
J. B. Weir

Inventor:
Nicholas Thomas
by Bond, Adams, Pickard & Jackson
Attys.

UNITED STATES PATENT OFFICE.

NICHOLAS THOMAS, OF BURLINGTON, WISCONSIN, ASSIGNOR OF ONE-HALF TO EDWIN CALDWELL AND ONE-HALF TO HIMSELF, BOTH OF BURLINGTON, WISCONSIN.

HAND-PROPELLED WAGON.

No. 917,910.      Specification of Letters Patent.      Patented April 13, 1909.

Application filed August 22, 1906. Serial No. 331,640.

*To all whom it may concern:*

Be it known that I, NICHOLAS THOMAS, a citizen of the United States, residing at Burlington, in the county of Racine, State of Wisconsin, have invented certain new and useful Improvements in Hand - Propelled Wagons, of which the following is a specification, reference being had to the accompanying drawings.

This invention relates to hand propelled vehicles of the kind intended chiefly for use by children, and it has for its objects to provide improved means for driving the wagon from its rear axle, such means comprising an improved clutch; to provide a construction that will obviate excessive friction between the driving gears on the rear axle and the rack bars employed in connection with such gears; to provide improved means for adjusting the pivoted operating handle so as to readily effect a change in the leverage to adapt it to the strength of the operator or the condition of the road being traveled over; to provide movable legs or supports at the rear end of the wagon whereby the rear wheels can be raised off the ground and the device as a whole thereby adapted as an exercising machine for indoor use; to provide clutch mechanism between the axle and the wheels carried thereby which will normally be in engagement, but which will slip to permit the turning of corners readily and easily—and to improve generally the construction and operation of vehicles of this character.

Those things that I believe to be new will be set forth in the claims.

Figures 6, 7:
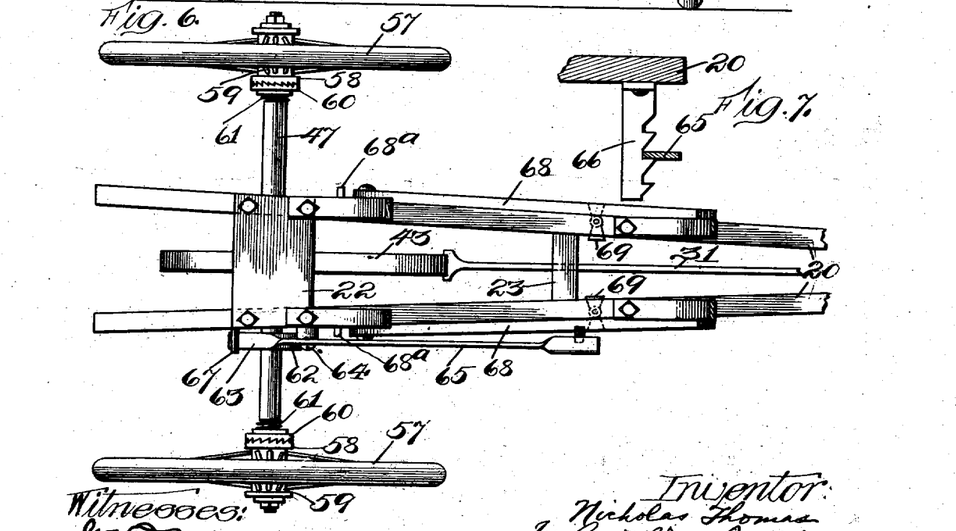
Fig. 6 is a top or plan view of the rear part of the wagon, with the seat and its supporting springs omitted, such view being taken at line 6 6 of Fig. 1.
Fig. 7 is a detail of the device for holding the brake handle in different positions.
Figures 8, 9, 10, 11:
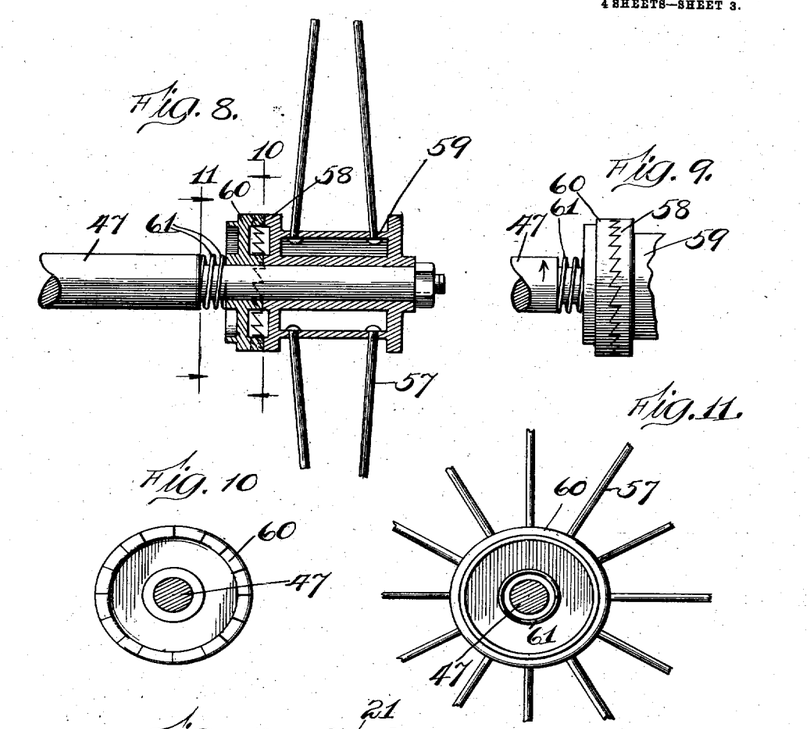
Fig. 8 is a detail, being a section through the hub of one of the rear wheels and the spring-actuated clutch connected therewith.
Fig. 9 is a detail, being an elevation of the spring-actuated clutch shown in section in Fig. 8.
Fig. 10 is a section taken at line 10 10 of Fig. 8.
Fig. 11 is a section taken at line 11 11 of Fig. 8.
Figure 12:
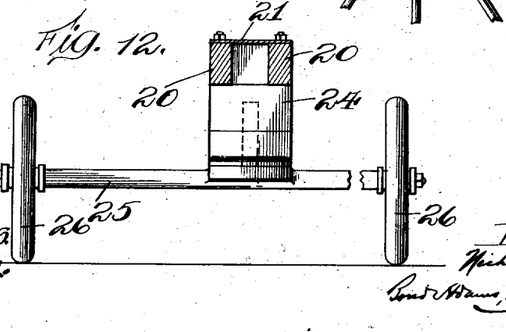
Fig. 12 is a detail of the front axle, partly broken away, and the axle and body bolsters, the wooden frame from which the body bolster depends being shown in section.

Referring to the several figures of the drawings, in which corresponding parts are indicated by like reference characters, 20 indicates a supporting frame consisting, as shown in Fig. 7, of two bars spaced apart and converging toward their front ends. Such bars are fastened together at their forward ends by a metal plate 21, and at their rear ends by another metal plate 22, and being further secured by a wooden cross piece 23 near their central portions. Secured to the lower faces of these bars at their forward ends is a body bolster 24, resting upon a bolster carried by the front axle 25. The front wheels are indicated by 26.

27 indicates a seat supported by the frame 20, springs 28 being preferably interposed between the seat and frame.

29 indicates an operating lever, having at its upper end a suitable cross piece 30 to form a handle to be grasped by the operator. This operating lever is pivotally attached at its lower end to a connecting bar 31 extending back toward the rear of the machine and connected with means hereinafter described for driving the rear axle of the wagon. The actuating lever extends up between the two frame bars 20, and passes through a box 32, such box passing through a slot 33 extending longitudinally of the frame in the metal plate 21. In the construction shown, this box in its lower end is provided on opposite sides with annular bearing faces 34 (see Fig. 4) which bear against the inner faces of blocks 35 lying against the inner faces of the frame bars 20, these blocks, in the construction shown, being held in place by integral flanges 36 bolted to the metal plate 21. These blocks 35 could, of course, be otherwise secured in place.

37 indicates trunnions carried by the bearing faces 34 and projecting into openings in the blocks 35. On these trunnions, the box 32 can be rocked back and forth in the slot 33.

Figure 1:
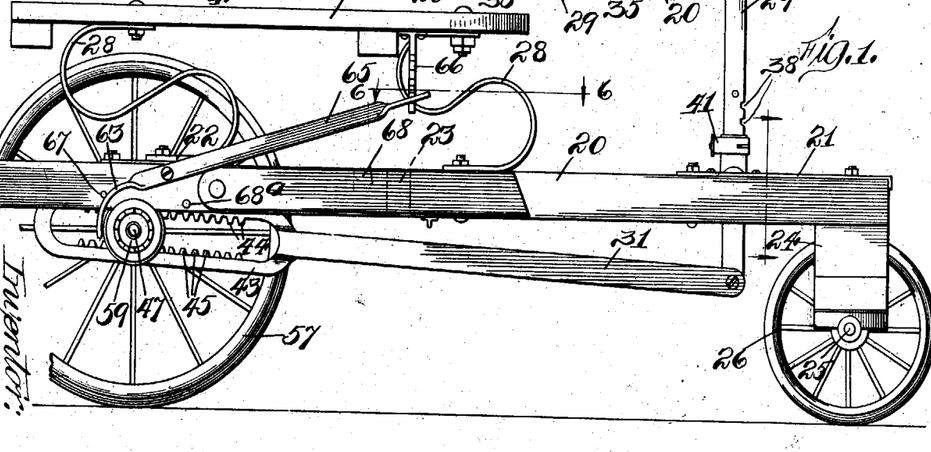
—Figure 1 is a side elevation of my improved wagon.
Figures 2, 3, 4:
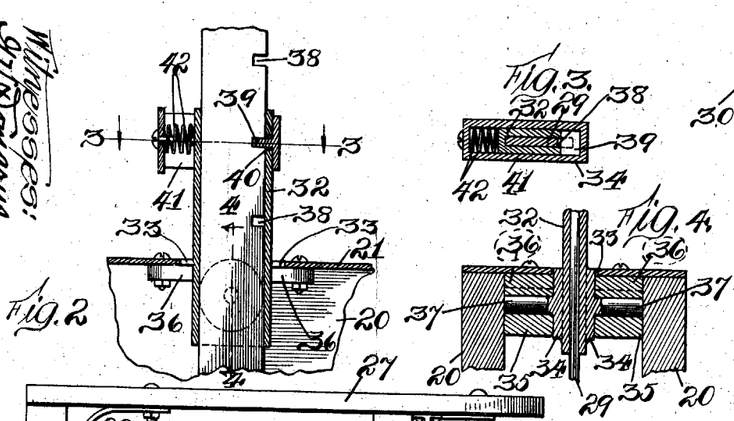
Fig. 2 is a detail, being a vertical section through the pivoted box through which the operating handle passes, and illustrating the means for adjusting such handle higher or lower.
Fig. 3 is a cross section taken at line 3 3 of Fig. 2.
Fig. 4 is a vertical section taken at line 4 4 of Fig. 2, and illustrating the manner of securing in place the box through which the actuating handle passes.
Figure 5:
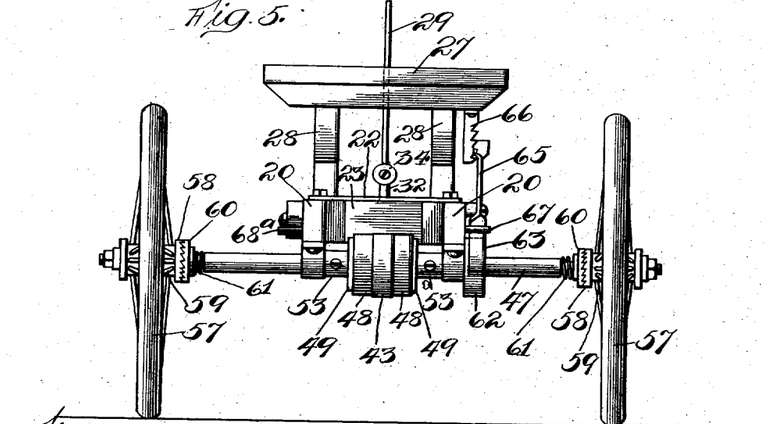
Fig. 5 is a rear elevation of my improved wagon.

It is frequently desirable to raise or lower the operating lever 29 in order to obtain the proper leverage suitable to the strength of the child operating the device or on account of the character of the road over which the wagon is being propelled. I accomplish this by providing a series of notches 38 in one edge of said lever into which a tooth 39 carried by a band 41—which may be either cast, as shown, or formed of sheet metal—that surrounds the box 34. This tooth projects through a slot 40 in the edge of the box 32, as shown in Fig. 2. The tooth 39 is held in engagement with any one of the notches 38 of the operating lever 29 by means of a coiled spring 42 interposed between the opposite end of the band 41 and the edge of the box 32. It is evident that by pushing the band 41 so as to compress the coiled spring 42 the tooth 39 carried by the band will be forced out of engagement with the operating lever 29, whereupon such operating lever can be moved higher or lower as desired, and can be locked in position by the tooth 39 entering another of the notches 38.

Figure 13:
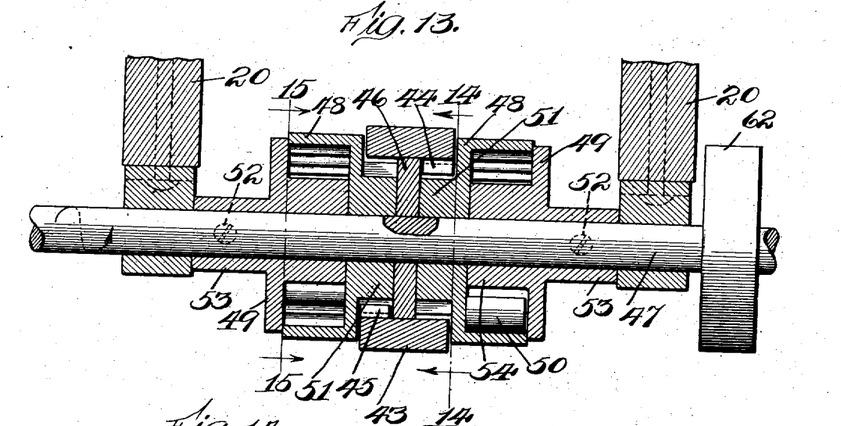
Fig. 13 is a detail, being an enlarged section through the double rack bar device and the clutches that carry the gears that coöperate with such double rack bar device.

43 indicates an open frame, the upper and lower sides of which are parallel, and the inner faces of which are provided with racks 44 and 45 respectively. As best shown in Fig. 13, these racks are not placed opposite each other, but are located so that when looking at the frame 43 from one end—as, for example, in the section in Fig. 13 where the view is looking toward the front of the machine—the upper rack 44 is at one side of the frame 43, while the other rack 45 is at the other side of such frame. As clearly shown in said Fig. 13, the inner face of each of the parallel bars at the side of each rack 44 45 is left plain to provide a smooth bearing face, such smooth bearing face being for the purpose of riding upon the edge of a disk 46 that is free to turn upon the rear axle 47 of the wagon, such axle, when the parts are in position for use, extending through such rack frame 43. The forward end of the rack frame 43 is connected in any suitable manner to the connecting bar 31.

Figure 15:
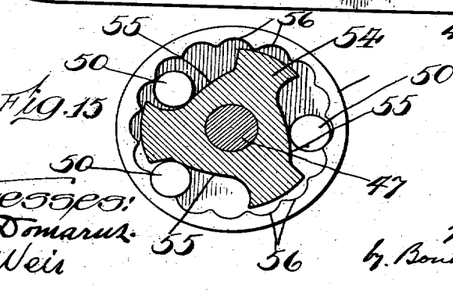
Fig. 15 is a section taken at line 15 15 of Fig. 13, and illustrating the interior construction of one of the clutches.

At each side of the rack bar 43 is located a clutch, each clutch consisting of a narrow annular casing 48, an annular disk 49 which fits against the open end of the casing 48, and one or more rollers 50. The part 48 of the clutch has formed on its face a hub portion 51 on the periphery of which teeth are formed, thus constituting such hub portion in effect a gear wheel, such gear wheel being adapted to mesh with one of the racks on the rack bar 43. The member 48 of the clutch is located at one side of the double rack bar 43 with its toothed hub or gear wheel 51 in mesh with one of the racks 44 or 45, and said member 48 is loose on the axle 47. The member 49 of the clutch is made fast to said axle 47 by means of a set screw 52 passing through a hub portion 53, or in any other desired manner, and, on the inner face of the member 49 and integral therewith, is a block 54 of a width substantially equal to the depth of the casing 48, as clearly shown in Fig. 13. This block is cut away on its edge to form cam surfaces 55, as best shown in Fig. 15. By the formation of these cam surfaces, considerable spaces are left between the rim or flange of the member 48 and the block 54, in which spaces are placed the rollers 50, before mentioned. The inner face of the rim or flange of the member 48 is formed with a series of shallow depressions 56, the depressions being curved to conform to the rollers. Each of the spaces between the rim or flange of the clutch member 48 and the edge of the block 54 is, by reason of the cam-shaped formation given to the edge of the block 54, materially wider at one end than at the other, the wider end being wider than the diameter of the roller placed therein. The result of this construction is that as the member 48 of the clutch is rotated on the axle 47, the rollers 50 will be successively and quickly moved toward the narrow ends of their respective spaces, and, as the roller gets toward the narrow end, it is wedged between the block 54 and the rim or flange of the member 48, thus locking the two parts 48 and 49 together, and, as the part 49 is fast to the axle 47, the rear wheels on such axle are necessarily driven. It is feasible, of course, to use but a single roller 50, but in that event a slight amount of lost motion might be occasioned before the member 48 had been rotated sufficiently to carry the roller to a position where it could travel to the smaller end of its space, and hence I prefer to employ a plurality of such rollers to insure an almost instantaneous gripping of the parts, as described, when it is desired to turn the axle. With a plurality of such rollers, one of them is certain to be in position to assume a gripping engagement instantly. The shallow recesses 56 forming seats for the rollers aid in holding such rollers in proper gripping position.

57 indicates the hind wheels of the wagon, and these hind wheels are secured to the axle spindle by means of an ordinary two-part clutch, one member 58 of which clutch is formed on the inner end of the wheel hub 59. The other member of the clutch is indicated by 60, such member being slidably mounted on the axle spindle, being so secured by a feather or other suitable device, and the two parts of the clutch are held in engagement by a coiled spring 61 bearing against the usual shoulder at the end of the axle spindle and against the face of the part 60 of the clutch. This spring 61 is strong enough to normally hold the two parts of the clutch in engagement, but when turning a corner the spring will be weak enough to permit the clutch members of the outer wheel to slip on each other.

62 indicates a brake drum against the surface of which a brake 63 is adapted to be forced, the brake being provided with a suitable handle 65 extending forward along the side of one of the frame bars 20. The brake handle is pivoted at 64, and at its forward end is adapted to be engaged by a notched bar 66 secured to the under of the adjacent frame bars 20. When the brake handle is disengaged from this notched bar 66, it is prevented from dropping too far down by a pin 67 that projects over the brake portion 63. The notched bar with which the handle 65 is adapted to be engaged is of use principally when the device as a whole is converted into an exercising machine for indoor use. It is so converted by turning down a pair of legs—one at each side—indicated by 68, such legs being pivoted to the outer faces of the frame bars 20. These legs can be turned down and back, resting against projecting pins 68ª, in which position they will keep the rear wheels lifted above the ground, and, while so lifted, the operator can work the operating lever 29 backward and forward just as it would be operated if the wagon were being propelled on the ground, and, in order that the required degree of frictional resistance may be had, the brake handle 65 is pulled up to force the brake 63 with the required degree of pressure against the drum 62, being held in the required position by engagement with one of the notches in the depending bar 66. By having the legs long enough to be swung back into an inclined position against the projecting pins 68ª and at the same time holding the wheels carried by such axle above the ground the machine will be held lifted in a firm manner at its rear end. When the wagon is to be used in the ordinary manner, the legs will be swung up alongside of the frame bars 20 and locked in position there by turnbuttons 69, as shown, or equivalent means. If desired, the leg on the opposite side from that at which the brake lever is attached may be made a trifle longer than the other leg and be swung back to bear against the rear axle 47, thus avoiding the use of the pin 68ª on that side. On the side where the brake lever is attached, however, a pin 68ª must be used as a stop, or otherwise the leg on that side, when swung back, would rest against the drum 62.

In operation, with the parts assembled as shown, and with an operator mounted on the seat 27, the wagon is propelled by moving the hand lever 29 backward and forward, which, through the connecting bar 31 reciprocates the double rack bar 43. The reciprocation of this rack bar causes a movement of the gears or hub portions 51 formed with the two clutch members 48, and of course rotates such members 48, the rotation of one being forward and the other backward. The rotation of that one of the clutch members 48 that is driven in a forward direction instantly causes a gripping engagement between it and its contained block 54 through the instrumentality of one of its rollers 50, as before explained, and, as the part 49 of the clutch, of which the block 54 is a part, is fast on the axle 47, such axle will be driven in a forward direction. The member 48 of the other clutch being rotated to the rear, its rollers 50 are not wedged between the two parts of the clutch, but, immediately upon the rearward rotation of such clutch, are instantly released from such gripping engagement as they, or any of them, have just previously had, with the result that while the part 49 of this clutch is free to turn forward with the axle to which it is secured, its other member 48 does not so turn. At each reversal in direction of the reciprocating motion of this double rack bar device 43, the clutch member 48 that has been locked to the axle, as before explained, so as to turn therewith, is instantly released so as to be freely turned backward and at the same time the member 48 of the other clutch is thrown into engagement with its coacting member.

Figure 14:
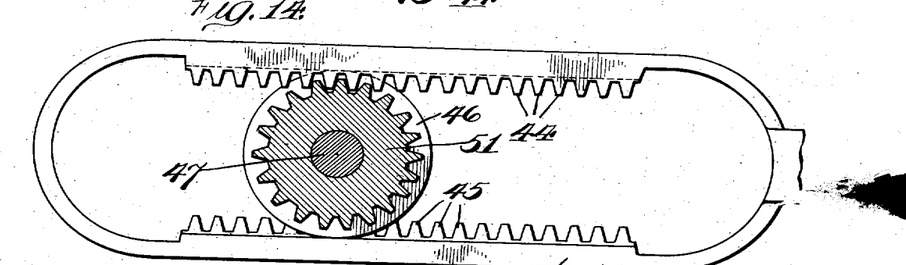
Fig. 14 is a section taken at line 14 14 of Fig. 13, the double rack bar device being shown in side elevation.

This alternate gripping and releasing of the loose clutch members 48 with the coacting members 49 is effected whether the double rack bar device 43 be moved to its limit in either direction, or whether such movement be but a very slight one. By providing a plain surface on the inner faces of the upper and lower bars of the double rack device at one side of the racks, a smooth bearing surface is afforded for traveling upon the rim of the disk 46 that is loose upon the axle 47. This disk 46, it will be seen, (see Figs. 13 and 14), is of such diameter as to insure the teeth of the hubs or gears 51 and the teeth forming the racks 44 and 45 from intermeshing to the full length of said teeth. This construction operates to lessen friction between the racks and gears and the rolling action of the disk on the plain faces of the parallel members of the device 43 also serves to cause such device 43 as a whole to run smoothly and with but a minimum amount of friction. When it is desired to coast down a hill, or upon a level surface after considerable momentum has been acquired, the reciprocation of the double rack bar 43 is checked by ceasing to work the lever 29, and as the member 48 of both clutches will be held against movement in either direction by the engagement of their respective rack bars 44 and 46, the gripping engagement between the two parts 48 and 49 of both clutches will be immediately destroyed and the driving axle 47 and attached clutch members 49 be allowed to turn freely. This coasting feature in connection with a wagon of this type is of very considerable value. To properly apply the power for driving the device so as to adapt the wagon to be easily operated by children of varying strength, and also to increase or diminish the power applied through the hand lever 29, such hand lever is made adjustable up and down to bring its pivotal point nearer to or farther from the connecting rod 31 to which it is attached, and, by adjustably securing this hand lever in the pivoted box 32, such adjustment of the hand lever can be very quickly and easily effected. This adjustment of the hand lever is also of value where it is desirable to apply the power to better advantage in going over rough or hilly ground.

What I claim as my invention and desire to secure by Letters Patent is:—

1. In a manually-propelled wagon, with a frame and a rear axle journaled thereto, of two clutches on said axle,—each clutch comprising a part fast on said axle, a part loose on the axle, and means for causing an engagement between said fast and loose parts when the said loose part is rotated in a forward direction,—a gear secured to each of said loose parts of the clutches, a double rack-bar for simultaneously driving said gears in opposite directions, said rack-bar having a smooth surface at one side of each rack, a disk loosely mounted on said axle and in contact with said smooth surfaces of the rack-bar, and means for reciprocating said double rack-bar, substantially as described.

2. In a manually-propelled wagon, the combination with a frame and a rear axle journaled thereto, of two clutches on said axle,—each clutch comprising an open ended casing loose on said axle, a disk fitting against such open end and having a block with a cam formed on its edge projecting into said casing, and a roller between said block and the flange or rim of the casing,—means for securing said second named clutch member to said axle, a gear carried by said loose or casing member of the clutch, and means for simultaneously rotating said gears in opposite directions to produce a continuous forward rotation of the said axle, substantially as described.

3. In a manually-propelled wagon, the combination with a frame and a rear axle journaled thereto, of two clutches on said axle,—each clutch comprising an open ended casing loose on said axle, a disk fitting against such open end and having a block with a cam formed on its edge projecting into said casing, and a roller between said block and the flange or rim of the casing,—means for securing said second named clutch member to said axle, a gear carried by said loose or casing member of the clutch, a frame having parallel rack-bars for meshing with said gears at opposite sides of said rear axle, and means for reciprocating said rack-bar frame, substantially as described.

4. In a manually-propelled wagon, the combination with a frame and a rear axle journaled thereto, of two clutches on said axle,—each clutch comprising an open ended casing loose on said axle, a disk fitting against such open end and having a block with a cam formed on its edge projecting into said casing, and a roller between said block and the flange or rim of the casing,—means for securing said second named clutch member to said axle, a gear carried by said loose or casing member of the clutch, a frame having parallel bars—each having on its inner face a rack portion and a smooth portion, an anti-friction device carried by the axle and located between the two clutches against which anti-friction device the said smooth portions of the parallel bars are adapted to bear, and means for reciprocating said last mentioned frame, substantially as described.

5. In a manually-propelled wagon, the combination with a frame, of an open-ended box pivotally connected therewith, a rocking lever passing through said box, means for adjustably securing said lever to said box, and reciprocating means connected with said lever for moving the wagon.

6. In a manually-propelled wagon, the combination with a frame, of an open-ended box pivotally connected therewith, a rocking lever passing through said box and provided with a series of notches, a slide carried by said box and adapted to engage in one of the notches in the lever to hold said lever locked to the box, and reciprocating means connected with said lever for moving the wagon.

7. In a manually-propelled wagon, the combination with a frame, of an open-ended box pivotally connected therewith, a rocking lever passing through said box and provided with a series of notches, a sliding band surrounding said box, a tooth carried by said band projecting through an opening in the box and adapted to project into one of the said notches of the lever to lock said lever and box together, and reciprocating means connected with said lever for moving the wagon.

8. Mechanism of the class described, comprising a pivoted member, a second member movably carried by said first member, resilient means for holding the second member in a plurality of positions with respect to said first member, said second member being releasable to permit its adjustment with respect to said first member, driving means, and means for operatively connecting said driving means and said second member.

NICHOLAS THOMAS.

Witnesses:
ALBERT H. ADAMS,
EDWIN CALDWELL.

---

Correction in Letters Patent No. 917,910.

It is hereby certified that in Letters Patent No. 917,910, granted April 13, 1909, upon the application of Nicholas Thomas, of Burlington, Wisconsin, for an improvement in "Hand-Propelled Wagons," an error appears in the printed specification requiring correction, as follows: On page 4, line 37, before the word "with," the words *the combination* should be inserted; and that the said Letters Patent should be read with this correction therein that the same may conform to the record of the case in the Patent Office.

Signed and sealed this 4th day of May, A. D., 1909.

[SEAL.]

C. C. BILLINGS,
*Acting Commissioner of Patents.* box and adapted to project into one of the said notches of the lever to lock said lever and box together, and reciprocating means connected with said lever for moving the wagon.

8. Mechanism of the class described, comprising a pivoted member, a second member movably carried by said first member, resilient means for holding the second member in a plurality of positions with respect to said first member, said second member being releasable to permit its adjustment with respect to said first member, driving means, and means for operatively connecting said driving means and said second member.

NICHOLAS THOMAS.

Witnesses:
ALBERT H. ADAMS,
EDWIN CALDWELL.

---

Correction in Letters Patent No. 917,910.

It is hereby certified that in Letters Patent No. 917,910, granted April 13, 1909, upon the application of Nicholas Thomas, of Burlington, Wisconsin, for an improvement in "Hand-Propelled Wagons," an error appears in the printed specification requiring correction, as follows: On page 4, line 37, before the word "with," the words *the combination* should be inserted; and that the said Letters Patent should be read with this correction therein that the same may conform to the record of the case in the Patent Office.

Signed and sealed this 4th day of May, A. D., 1909.

[SEAL.]

C. C. BILLINGS,
*Acting Commissioner of Patents.*

It is hereby certified that in Letters Patent No. 917,910, granted April 13, 1909, upon the application of Nicholas Thomas, of Burlington, Wisconsin, for an improvement in "Hand-Propelled Wagons," an error appears in the printed specification requiring correction, as follows: On page 4, line 37, before the word "with," the words *the combination* should be inserted; and that the said Letters Patent should be read with this correction therein that the same may conform to the record of the case in the Patent Office.

Signed and sealed this 4th day of May, A. D., 1909.

[SEAL.]

C. C. BILLINGS,
*Acting Commissioner of Patents.*